United States Patent
Fattal

(10) Patent No.: US 10,728,533 B2
(45) Date of Patent: Jul. 28, 2020

(54) MULTIBEAM DIFFRACTION GRATING-BASED NEAR-EYE DISPLAY

(71) Applicant: LEIA INC., Menlo Park, CA (US)

(72) Inventor: David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 9 days.

(21) Appl. No.: 15/944,710

(22) Filed: Apr. 3, 2018

(65) Prior Publication Data

US 2018/0227576 A1  Aug. 9, 2018

Related U.S. Application Data

(63) Continuation of application No. PCT/US2016/013757, filed on Jan. 16, 2016.
(Continued)

(51) Int. Cl.
*G06T 11/60* (2006.01)
*H04N 13/351* (2018.01)
(Continued)

(52) U.S. Cl.
CPC .............. *H04N 13/351* (2018.05); *G02B 6/00* (2013.01); *G02B 6/0035* (2013.01);
(Continued)

(58) Field of Classification Search
CPC .......... H04N 9/31; H04N 13/00; G02B 27/01; G02B 27/14; G02B 27/10; G02B 27/0172; G02B 5/188; G02B 5/189
(Continued)

(56) References Cited

U.S. PATENT DOCUMENTS

| 5,617,248 A | 4/1997 | Takahashi et al. |
| 9,298,168 B2 | 3/2016 | Taff et al. |
| | (Continued) | |

FOREIGN PATENT DOCUMENTS

| JP | 2009533721 A | 9/2009 |
| TW | 201506473 A | 2/2015 |
| | (Continued) | |

OTHER PUBLICATIONS

International Search Report (ISR) from the International Searching Authority (ISA/KR) dated Jul. 15, 2016 (3 pages) for counterpart parent PCT Application No. PCT/US2016/013757.
(Continued)

*Primary Examiner* — Howard D Brown, Jr.
(74) *Attorney, Agent, or Firm* — J. Michael Johnson

(57) ABSTRACT

A near-eye display and a binocular near-eye display system provide a plurality of different views of an image to different locations within an eye box to impart focus depth cues to a user. The near-eye display includes a multibeam diffraction grating-based display configured to provide the different views and an optical system configured to relay the different views to the different locations within the eye box. The binocular near-eye display system includes a pair of the multibeam diffraction grating-based displays and a binocular optical system configured to provide and relay a stereoscopic image pair representing a three-dimensional (3D) scene to a corresponding pair of laterally displaced eye boxes.

25 Claims, 5 Drawing Sheets

Related U.S. Application Data

(60) Provisional application No. 62/242,980, filed on Oct. 16, 2015.

(51) Int. Cl.

| | | |
|---|---|---|
| *F21V 8/00* | (2006.01) | |
| *G02B 6/00* | (2006.01) | |
| *H04N 13/344* | (2018.01) | |
| *G02B 27/42* | (2006.01) | |
| *G02B 30/36* | (2020.01) | |
| *H04N 13/32* | (2018.01) | |
| *H04N 13/324* | (2018.01) | |
| *G02B 27/01* | (2006.01) | |

(52) U.S. Cl.
CPC ......... *G02B 27/4205* (2013.01); *G02B 30/36* (2020.01); *H04N 13/32* (2018.05); *H04N 13/324* (2018.05); *H04N 13/344* (2018.05); *G02B 27/0172* (2013.01); *G02B 2027/0127* (2013.01); *G02B 2027/0134* (2013.01); *H04N 2213/001* (2013.01)

(58) Field of Classification Search
USPC ..................................................... 348/51–60
See application file for complete search history.

(56) References Cited

U.S. PATENT DOCUMENTS

| | | | |
|---|---|---|---|
| 9,389,415 B2 | 7/2016 | Fattal et al. | |
| 9,459,461 B2 | 10/2016 | Santori et al. | |
| 9,557,466 B2 | 1/2017 | Fattal | |
| 9,785,119 B2 | 10/2017 | Taff et al. | |
| 9,846,307 B2 * | 12/2017 | Tremblay | G02B 26/10 |
| 2003/0067685 A1 | 4/2003 | Niv | |
| 2007/0242237 A1 | 10/2007 | Thomas | |
| 2010/0177388 A1 | 7/2010 | Cohen et al. | |
| 2011/0157667 A1 | 6/2011 | Lacoste et al. | |
| 2012/0032874 A1 * | 2/2012 | Mukawa | G02B 3/12 345/8 |
| 2012/0119978 A1 | 5/2012 | Border et al. | |
| 2012/0162549 A1 | 6/2012 | Gao et al. | |
| 2013/0258461 A1 | 10/2013 | Sato et al. | |
| 2014/0064655 A1 | 3/2014 | Nguyen et al. | |
| 2014/0071539 A1 | 3/2014 | Gao | |
| 2014/0104685 A1 | 4/2014 | Bohn et al. | |
| 2014/0268867 A1 | 9/2014 | Fiorentino et al. | |
| 2014/0300840 A1 | 10/2014 | Fattal et al. | |
| 2014/0333517 A1 | 11/2014 | Travis | |
| 2015/0036068 A1 | 2/2015 | Fattal et al. | |
| 2015/0226973 A1 * | 8/2015 | Huang | G02B 30/26 353/7 |
| 2015/0234205 A1 | 8/2015 | Schowengerdt | |
| 2016/0195664 A1 | 7/2016 | Fattal et al. | |
| 2017/0078652 A1 | 3/2017 | Hua et al. | |
| 2017/0213377 A1 * | 7/2017 | Torii | G06T 11/00 |
| 2018/0084232 A1 * | 3/2018 | Belenkii | G02B 26/0833 |

FOREIGN PATENT DOCUMENTS

| | | |
|---|---|---|
| WO | 2017039820 A1 | 3/2017 |
| WO | 2017039825 A1 | 3/2017 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Huang, Fu-Chung, et al., "The Light Field Stereoscope—Immersive Computer Graphics via Factored Near-Eye Field Displays with Focus Cues," SIGGRAPH 2015, 12 pages, Stanford Computational Imaging Lab, computationalimagaing.org.

Lanman, Douglas, et al., "Near-Eye Light Field Displays," ACM Transactions on Graphics (TOG)—Proceedings of ACM—SIGGRAPH Asia, Nov. 2013, 10 pages, vol. 32, Issue 6, Article No. 220.

Hua, Hong, et al., "A 3D integral imaging optical see-through head-mounted display," Optics Express, Jun. 2, 2014, pp. 13484-13491, vol. 22, No. 11, Copyright OSA 2014.

Cheng, Dewen, et al., "Design of a wide-angle, lightweight head-mounted display using free-form optics tiling," Optics Letters, Jun. 1, 2011, pp. 2098-2100. vol. 36, No. 11.

Search Report (SR) from the Taiwan Intellectual Property Office (TIPO) dated Oct. 30, 2017 (1 page English translation and 1 Pg original language document) for foreign counterpart patent application No. 105142562 to counterpart parent PCT application No. PCT/US2016/013757.

* cited by examiner

MULTIBEAM DIFFRACTION GRATING-BASED NEAR-EYE DISPLAY

CROSS-REFERENCE TO RELATED APPLICATIONS

This application is a continuation patent application of and claims the benefit of priority to International Application No. PCT/US2016/013757, filed Jan. 16, 2016, which claims priority from U.S. Provisional Patent Application Ser. No. 62/242,980, filed Oct. 16, 2015, the entire contents of which are incorporated herein by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

In addition to being classified as either active or passive, electronic displays may also be characterized according to an intended viewing distance of the electronic display. For example, the vast majority of electronic displays are intended to be located at a distance that is within a normal or 'natural' accommodation range of the human eye. As such, the electronic display may be viewed directly and naturally without additional optics. Some displays, on the other hand, are specifically designed to be located closer to a user's eye than the normal accommodation range. These electronic displays are often referred to as 'near-eye' displays and generally include optics of some form to facilitate viewing. For example, the optics may provide a virtual image of the physical electronic display that is within normal accommodation range to enable comfortable viewing even though the physical electronic display itself may not be directly viewable. Examples of applications that employ near-eye displays include, but are not limited to, head mounted displays (HMDs) and similar wearable displays as well as some head-up displays. Various virtual reality systems as well as augmented reality systems frequently include near-eye displays, since the near-eye display may provide a more immersive experience than conventional displays in such applications.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1:
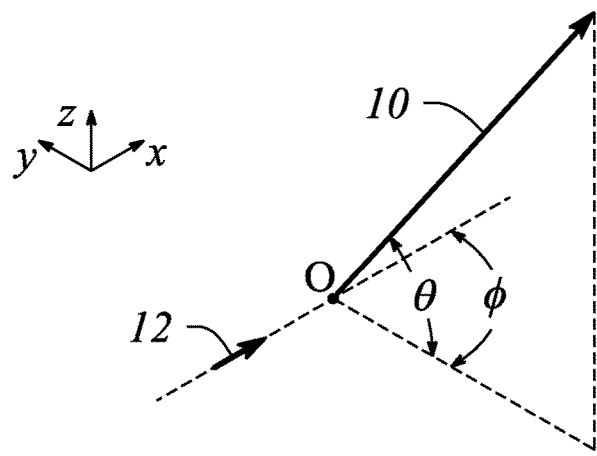
FIG. 1 illustrates a graphical view of angular components $\{\theta, \phi\}$ of a light beam having a particular principal angular direction, according to an example of the principles describe herein.

Certain examples and embodiments have other features that are one of in addition to and in lieu of the features illustrated in the above-referenced figures. These and other features are detailed below with reference to the above-referenced figures.

DETAILED DESCRIPTION

Embodiments and examples in accordance with the principles described herein provide a near-eye image display that provides accommodation support. In particular, according to various embodiments of the principles described herein, a near-eye display employs a multiview display to produce a plurality of different views of an image. The plurality of different views are projected or mapped to different locations within an eye box at which the near-eye displayed image is to be viewed. The different views at different locations may support accommodation (i.e., support focusing the eye on an object) with respect to the displayed image, according to various embodiments.

According to various embodiments, the multiview display comprises a multibeam diffractive grating-based backlight. The multibeam diffractive grating-based backlight employs multibeam diffractive coupling of light from a light guide using a multibeam diffraction grating to produce light beams corresponding to the plurality of different views. In some embodiments, the different views may be substantially similar to different views produced by a three-dimensional (3D) electronic display (e.g., an autostereoscopic or 'glasses free' 3D electronic display) based on the multibeam diffractive grating-based backlight, according to some embodiments.

As such, the multiview display may be referred to as a multibeam diffraction grating-based display.

According to various embodiments, the multibeam diffraction grating-based display has an array of multibeam diffraction gratings. The multibeam diffraction gratings are used to couple light from a light guide and to provide coupled-out light beams corresponding to pixels of the multibeam diffraction grating-based display or equivalently pixels of different views of the displayed image. In particular, according to various embodiments, the coupled-out light beams have different principal angular directions from one another. Further, in some embodiments, these differently directed light beams produced by the multibeam diffraction grating may be modulated and serve as pixels corresponding to different views of the displayed image.

Herein, a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small region of the plate light guide, the top and bottom surfaces are substantially parallel or co-planar.

In some embodiments, a plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the plate light guide to guide light.

Herein, a 'diffraction grating' and more specifically a 'multibeam diffraction grating' is generally defined as a plurality of features (i.e., diffractive features) arranged to provide diffraction of light incident on the diffraction grating. In some examples, the plurality of features may be arranged in a periodic or quasi-periodic manner. For example, the plurality of features (e.g., a plurality of grooves in a material surface) of the diffraction grating may be arranged in a one-dimensional (1-D) array. In other examples, the diffraction grating may be a two-dimensional (2-D) array of features. The diffraction grating may be a 2-D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating (i.e., diffracted light) generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from light guide.

Further, by definition herein, the features of a diffraction grating are referred to as 'diffractive features' and may be one or more of at, in and on a surface (i.e., wherein a 'surface' refers to a boundary between two materials). The surface may be a surface of a plate light guide. The diffractive features may include any of a variety of structures that diffract light including, but not limited to, one or more of grooves, ridges, holes and bumps, and these structures may be one or more of at, in and on the surface. For example, the diffraction grating may include a plurality of parallel grooves in a material surface. In another example, the diffraction grating may include a plurality of parallel ridges rising out of the material surface. The diffractive features (whether grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

By definition herein, a 'multibeam diffraction grating' is a diffraction grating that produces coupled-out light that includes a plurality of light beams. Further, the light beams of the plurality produced by a multibeam diffraction grating have different principal angular directions from one another, by definition herein. In particular, by definition, a light beam of the plurality has a predetermined principal angular direction that is different from another light beam of the light beam plurality as a result of diffractive coupling and diffractive redirection of incident light by the multibeam diffraction grating. The light beam plurality may represent a light field. For example, the light beam plurality may include eight light beams that have eight different principal angular directions. The eight light beams in combination (i.e., the light beam plurality) may represent the light field, for example. According to various embodiments, the different principal angular directions of the various light beams are determined by a combination of a grating pitch or spacing and an orientation or rotation of the diffractive features of the multibeam diffraction grating at points of origin of the respective light beams relative to a propagation direction of the light incident on the multibeam diffraction grating.

In particular, a light beam produced by the multibeam diffraction grating has a principal angular direction given by angular components $\{\theta, \phi\}$, by definition herein. The angular component θ is referred to herein as the 'elevation component' or 'elevation angle' of the light beam. The angular component φ is referred to as the 'azimuth component' or 'azimuth angle' of the light beam. By definition, the elevation angle θ is an angle in a vertical plane (e.g., perpendicular to a plane of the multibeam diffraction grating) while the azimuth angle φ is an angle in a horizontal plane (e.g., parallel to the multibeam diffraction grating plane). FIG. 1 illustrates the angular components {θ, φ} of a light beam 10 having a particular principal angular direction, according to an example of the principles describe herein. In addition, the light beam 10 is emitted or emanates from a particular point, by definition herein. That is, by definition, the light beam 10 has a central ray associated with a particular point of origin within the multibeam diffraction grating. FIG. 1 also illustrates the light beam point of origin O. An example propagation direction of incident light is illustrated in FIG. 1 using a bold arrow 12 directed toward the point of origin O.

According to various embodiments, characteristics of the multibeam diffraction grating and features (i.e., diffractive features) thereof, may be used to control one or both of the angular directionality of the light beams and a wavelength or color selectivity of the multibeam diffraction grating with respect to one or more of the light beams. The characteristics that may be used to control the angular directionality and wavelength selectivity include, but are not limited to, one or more of a grating length, a grating pitch (feature spacing), a shape of the features, a size of the features (e.g., groove width or ridge width), and an orientation of the grating. In some examples, the various characteristics used for control may be characteristics that are local to a vicinity of the point of origin of a light beam.

Further according to various embodiments described herein, the light coupled out of the light guide by the diffraction grating (e.g., a multibeam diffraction grating) represents a pixel of an electronic display. In particular, the light guide having a multibeam diffraction grating to produce the light beams of the plurality having different principal angular directions may be part of a backlight of or used in conjunction with an electronic display such as, but not limited to, a multiview display, a 'glasses free' three-dimensional (3D) electronic display (also referred to as a 'holographic' electronic display or an autostereoscopic display). As such, the differently directed light beams produced by coupling out guided light from the light guide using the multibeam diffractive grating may be or represent different views of an image (e.g., a 3D image) being displayed. Further, the differently directed light beams have directions corresponding to the different view angles of the different image views.

Herein a 'collimator' is defined as substantially any optical device or apparatus that is configured to collimate light. For example, a collimator may include, but is not limited to, a collimating mirror or reflector, a collimating lens, and various combinations thereof. In some embodiments, the collimator comprising a collimating reflector may have a reflecting surface characterized by a parabolic curve or shape. In another example, the collimating reflector may comprise a shaped parabolic reflector. By 'shaped parabolic' it is meant that a curved reflecting surface of the shaped parabolic reflector deviates from a 'true' parabolic curve in a manner determined to achieve a predetermined reflection characteristic (e.g., a degree of collimation). Similarly, a collimating lens may comprise a spherically shaped surface (e.g., a biconvex spherical lens).

In some embodiments, the collimator may be a continuous reflector or a continuous lens (i.e., a reflector or lens having a substantially smooth, continuous surface). In other embodiments, the collimating reflector or the collimating lens may comprise a substantially discontinuous surface such as, but not limited to, a Fresnel reflector or a Fresnel lens that provides light collimation. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape in one or both of two orthogonal directions that provides light collimation, according to some embodiments.

Herein, a 'light source' is defined as a source of light (e.g., an apparatus or device that emits light). For example, the light source may be a light emitting diode (LED) that emits light when activated. The light source may be substantially any source of light or optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by a light source may have a color or may include a particular wavelength of light. As such, a 'plurality of light sources of different colors' is explicitly defined herein as a set or group of light sources in which at least one of the light sources produces light having a color, or equivalently a wavelength, that differs from a color or wavelength of light produced by at least one other light source of the light source plurality. Moreover, the 'plurality of light sources of different colors' may include more than one light source of the same or substantially similar color as long as at least two light sources of the plurality of light sources are different color light sources (i.e., at least two light sources produce colors of light that are different). Hence, by definition herein, a plurality of light sources of different colors may include a first light source that produces a first color of light and a second light source that produces a second color of light, where the second color differs from the first color.

The term 'accommodation' as employed herein refers to a process of focusing upon an object or image element by changing an optical power of the eye. In other words, accommodation is the ability of the eye to focus. Herein, 'accommodation range' or equivalently 'accommodation distance' is defined as a range of distance from the eye at which focus may be achieved. While accommodation range may vary from one individual to another, herein a minimum 'normal' accommodation distance of about twenty-five (25) centimeters (cm) is assumed, for example, by way of simplicity. As such, for an object to be within a so-called 'normal' accommodation range, the object is generally understood to be located greater than about 25 cm from the eye. Further, by definition herein, a near-eye display is a display having at least a portion of the display located closer than 25 cm from the eye of a user of the near-eye display.

Herein, 'eye box' is defined as a region or volume of space in which an image formed by a display or other optical system (e.g., lens system) may be viewed. In other words, the eye box defines a location in space within which a user's eye may be placed in order to view an image produced by the display system. In some embodiments, the eye box may represent a two dimensional region of space (e.g., a region with length and width but without substantial depth), while in other embodiments, the eye box may include a three-dimensional region of space (e.g., a region with length, width and depth). Further, while referred to as a 'box', the eye box may not be restricted to a box that rectangular in shape. For example, the eye box may comprise a cylindrical region of space, in some embodiments.

Further, as used herein, the article 'a' is intended to have its ordinary meaning in the patent arts, namely 'one or more'. For example, 'a grating' means one or more gratings and as such, 'the grating' means 'the grating(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 2:
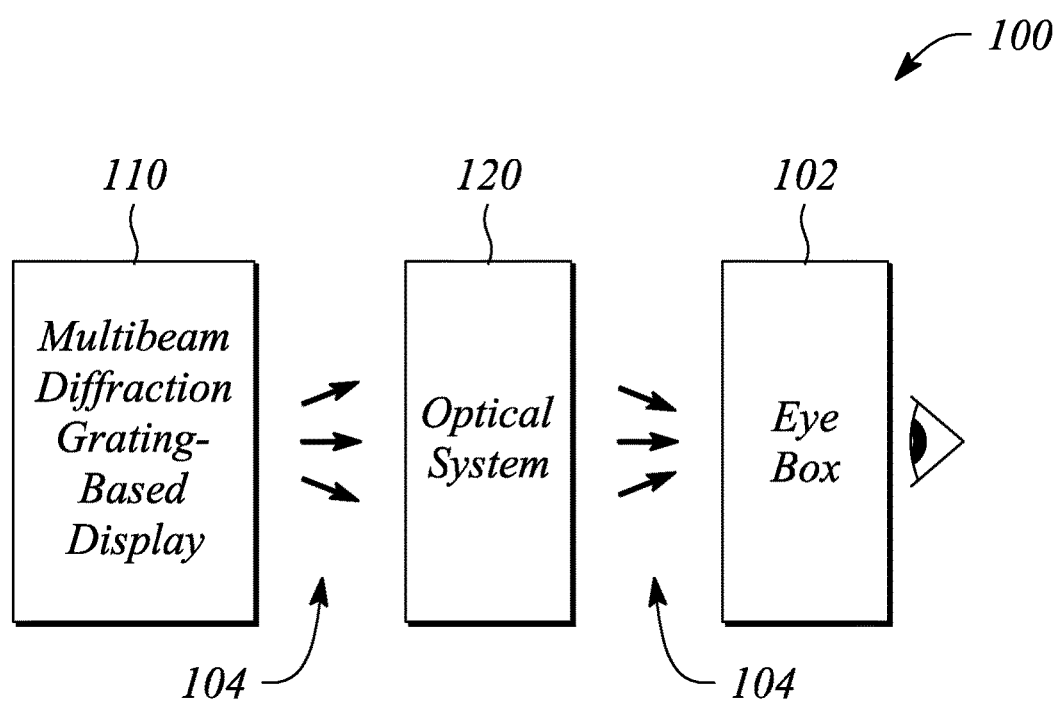
FIG. 2 illustrates a block diagram of a near-eye display in an example, according to an embodiment of the principles described herein.

According to some embodiments of the principles described herein, a near-eye display is provided. FIG. 2 illustrates a block diagram of a near-eye display 100 in an example, according to an embodiment of the principles described herein. The near-eye display 100 is configured to provide an image (i.e., displayed image) at an eye box 102 of the near-eye display 100. In particular, the near-eye display 100 may be configured to provide a plurality of different views 104 of the displayed image. Further, the different views 104 may be provided at different locations within the eye box 102. According to various embodiments, the different views 104 provided at different locations within the eye box 102 are configured to impart focus depth cues to a user of the near-eye display 100, according to various embodiments. The focus depth cues may enable the user to perceive depth or distance within the displayed image based on the focus depth cues, for example. The focus depth cues imparted to a user by the near-eye display 100 may include, but are not limited to, accommodation and retinal blurring.

As illustrated in FIG. 2, the near-eye display 100 comprises a multibeam diffraction grating-based display 110. The multibeam diffraction grating-based display 110 is configured to provide the plurality of different views 104 of the displayed image. According to various embodiments, substantially any number of different views may be provided as the plurality of different views 104. For example, the plurality of different views 104 of the displayed image may include two, three, four, five, six, seven, eight or more different views. In other examples, the plurality of different views 104 of the displayed image includes a relatively large number of different views up to and including, but not limited to, sixteen (16), thirty-two (32), sixty-four (64), one hundred twenty-eight (128), or two hundred fifty-six (256) different views. In some embodiments, the plurality of different views 104 includes at least four different views.

In some embodiments, the image provided or displayed by the near-eye display 100 comprises a three-dimensional (3D) image or portions thereof. For example, the displayed image may be a complete 3D or 'multiview' image. In another example, the displayed image may include 3D image portions along with 2D image portions. When the displayed image comprises a 3D image, the plurality of different views 104 may represent different perspective views (i.e., '3D views') of the 3D image. According to the principles described herein, the different views (e.g., 3D views) may enhance a user's perception of depth within the displayed image through one or both of retinal blurring and accommodation, for example. In some examples (e.g., in a near-eye binocular display system, described below), accommodation may mitigate effects of the so-called accommodation-convergence discrepancy often encountered in 3D imagery and 3D displays.

The near-eye display 100 illustrated in FIG. 2 further comprises an optical system 120. According to various embodiments, the optical system 120 is configured to relay the displayed image to the eye box 102 of the near-eye display 100. In particular, according to various embodiments, the optical system 120 is configured to relay the plurality of different views 104 of the displayed image to a corresponding plurality of different locations within the eye box 102. The relay of the different views 104 to the different locations within the eye box 102 is configured to impart focus depth cues to a user of the near-eye display 100, according to various embodiments. For example, a first view of the displayed image may be relayed by the optical system 120 to a first location, while a second view may be relayed by the optical system 120 to a second location within the eye box 102 that is separated from the first location. The first and second locations may be laterally separated from one another, for example. The separation of the first and second views at the corresponding first and second locations may allow a user to accommodate differently within the displayed image with respect to the two views thereof, for example.

According to some embodiments, a total angular extent of the plurality of different views 104 provided by the multibeam diffraction grating-based display 110 at an input aperture of the optical system 120 is configured to correspond to a size of the input aperture. In particular, an angle subtended by a combination of the different views 104 of the plurality is configured such that no substantial portion of any of the different views 104 lies outside of or beyond the input aperture. In other words, substantially all output light beams of the multibeam diffraction grating-based display 110 associated with the different views 104 are configured to be received within the input aperture of the optical system 120, according to some embodiments. In some examples, the total angular extent (i.e., subtended angle) of the plurality of different views 104 may be configured to substantially correspond to the input aperture size one or both of by a predetermined distance between the multibeam diffraction grating-based display 110 and the optical system input aperture and by a predetermined angular spread of the different views 104 provided by the multibeam diffraction grating-based display 110.

According to some embodiments, the optical system 120 comprises a magnifier. In some embodiments, the magnifier comprises a simple magnifier. The simple magnifier is configured to provide a virtual image of the displayed image located a distance from the eye box 102 corresponding to a normal accommodation range of an eye of a user. Further, the virtual image provided by the simple magnifier includes the plurality of different views 104 of the displayed image, according to various embodiments. In other embodiments, the magnifier may be a complex magnifier (e.g., multiple lenses configured to provide magnification).

As employed herein, a 'simple magnifier' is defined as a lens or similar optical apparatus that forms a magnified or enlarged virtual image of a smaller object or image (i.e., the simple magnifier provides angular magnification). The virtual image formed by the simple magnifier may be formed at an output of the simple magnifier or equivalently at an output aperture or iris of the simple magnifier (e.g., at the eye box 102). Further, by definition herein, the simple magnifier may form the enlarged virtual image at an apparent or virtual distance that is greater than an actual distance of the object. As such, the simple magnifier may be used provide a user or 'viewer' the ability to focus on an object that is located less than a normal accommodation range or distance from the eye of the user. Herein, 'normal accommodation' is generally achievable at and thus is defined herein as a distance that is greater than about twenty-five (25) centimeters (cm) from a user's eye, according to some embodiments. As a result, the simple magnifier of the optical system 120 may allow the plurality of different views 104 of the displayed image (i.e., the 'object') to be comfortably viewed in focus by the user even though the multibeam diffraction grating-based display 110 that provides the displayed image is closer than a normal accommodation distance (i.e., closer than about 25 centimeters) from the user's eye (i.e., or equivalently the eye box 102 of the near-eye display 100).

Figure 3:
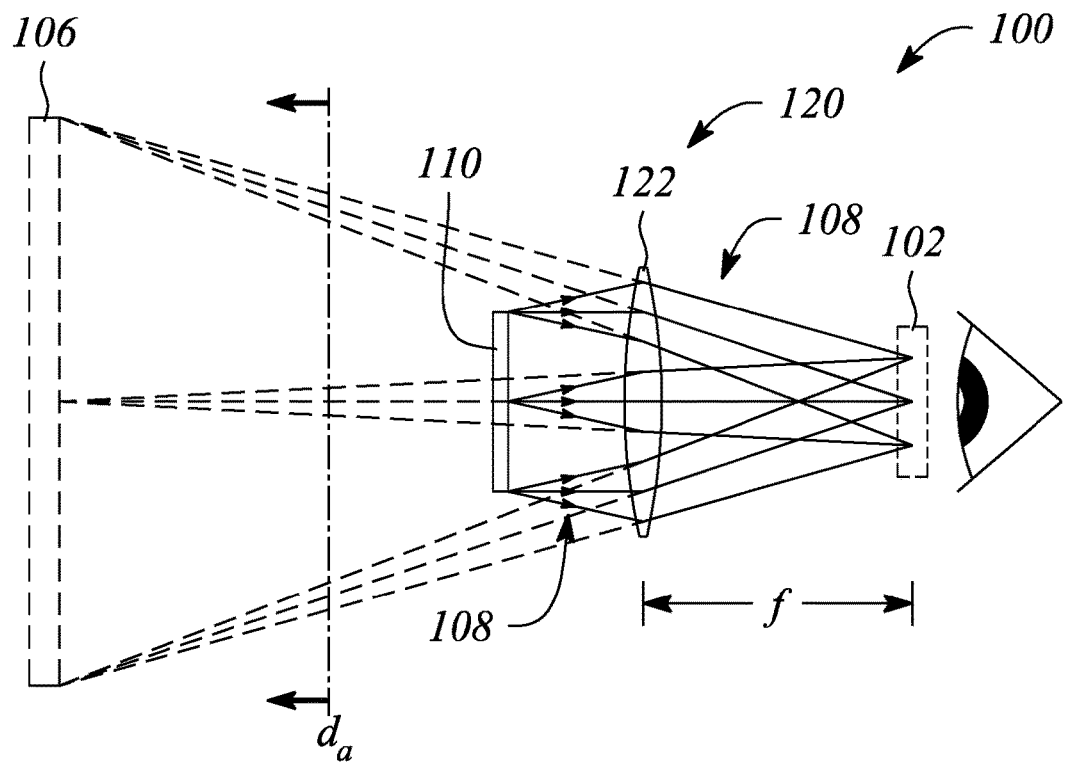
FIG. 3 illustrates a schematic view of optics of a near-eye display in an example, according to an embodiment consistent with the principles described herein.

FIG. 3 illustrates a schematic view of optics of the near-eye display 100 in an example, according to an embodiment consistent with the principles described herein. As illustrated, the optical system 120 comprises a simple magnifier 122 having a focal length f. The simple magnifier 122 in FIG. 3 is illustrated as a biconvex lens by way of example and not limitation. The simple magnifier 122 may be located a distance from the eye box 102 corresponding to the focal length f of the simple magnifier 122 (e.g., as illustrated in FIG. 3). Further, the simple magnifier 122 is located between the multibeam diffraction grating-based display 110 and the eye box 102. The simple magnifier 122 is configured to provide a virtual image 106 of the displayed image formed by the plurality of different views (e.g., different views 104 in FIG. 2) from the multibeam diffraction grating-based display 110 (i.e., as seen at the eye box 102 when viewed through the simple magnifier 122). Due to the magnification provided by the simple magnifier 122, the virtual image 106 is located (or at least appears to be located) at a greater distance from the eye box 102 than that of the actual or physical image (i.e., display image) produced by the multibeam diffraction grating-based display 110. In particular, the virtual image 106 may be located within a normal accommodation range or distance $d_a$ of the human eye when viewed from the eye box 102, while the multibeam diffraction grating-based display 110 (or equivalently, the image produced or displayed by the multibeam diffraction grating-based display 110) may be closer to the eye box 102 than the normal accommodation range, according to some embodiments. Thus, the simple magnifier 122 may facilitate comfortable viewing of the multibeam diffraction grating-based display 110 (or equivalently an output or virtual image 106 of the multibeam diffraction grating-based display 110) at the eye box 102, for example.

Further illustrated in FIG. 3 as solid and dashed lines are rays 108 (rays of light) emanating from the multibeam diffraction grating-based display 110, as further described below. The solid lines depict actual rays 108 associated with the different views 104 of the displayed image provided by the multibeam diffraction grating-based display 110, while the dashed lines depict ray projections corresponding to the virtual image 106. The rays 108 illustrated in FIG. 3 may correspond to various coupled-out light beams (i.e., rays of light) produced by the multibeam diffraction grating-based display 110, as described below, for example. Further, the rays 108 depicted as converging at different points within the eye box 102 may represent different views of the displayed image provided by the multibeam diffraction grating-based display 110 after the different views have been relayed to different locations within the eye box 102.

According to some embodiments, both of the multibeam diffraction grating-based display 110 and the optical system 120 are located within and substantially block a portion of a field-of-view (FOV) of a user. In these embodiments, the near-eye display 100 may be a virtual reality display. In particular, the near-eye display 100 may be configured to supplant or at least substantially supplant a view of a physical environment (i.e., real world view) with the near-eye display image within the blocked FOV portion. That is, the near-eye display image may substantially replace the physical environment view with the blocked FOV portion. According to various embodiments, the blocked FOV portion may include some or all of the user's FOV. By supplanting the physical environment view, the user is provided with a virtual reality view provided by the near-eye display image (and associated plurality of different views) instead of the physical environment view.

Herein, the 'view of the physical environment' or 'physical environment view' is defined as a view that a user would have in the absence of the near-eye display 100. Equivalently, the physical environment is anything beyond the near-eye display 100 that may be visible to the user, and the physical environment 'view' is anything that would be within the FOV of the user, exclusive of any effect that the near-eye display 100 may have on the user's view, by definition herein.

In other embodiments, the multibeam diffraction grating-based display 110 is located outside of the FOV of the user, while the optical system 120 or a portion thereof is located within the FOV. In these embodiments, the near-eye display 100 may be an augmented reality display. In particular, the near-eye display 100 may be configured to augment a view of the physical environment with the near-eye display image (and associated different views 104 of the plurality). Moreover, as an augmented reality display, the near-eye display 100 is configured to provide a view to the user that is a superposition or combination of the near-eye display image and the view of the physical environment beyond the near-eye display 100.

In some embodiments, the optical system 120 of the near-eye display 100 configured as an augmented reality display comprises a freeform prism. The freeform prism is configured to relay the displayed image including the plurality of different views 104 from the multibeam diffraction grating-based display 110 to the eye box 102 for viewing by a user. Moreover, the freeform prism is configured to relay the displayed image from the multibeam diffraction grating-based display 110 that is located beyond or outside of an FOV of the user. The freeform prism relays the displayed image using total internal reflection between two surfaces (e.g., a front surface and a back surface) of the freeform prism, according to various embodiments. In some embodiments, the freeform prism is or may serve as a simple magnifier (e.g., the simple magnifier 122).

In some embodiments, the optical system 120 configured as an augmented reality display may further comprise a freeform compensation lens. The freeform compensation lens may also be referred to as a freeform corrector. In particular, the freeform compensation lens is configured to compensate or correct for an effect that the freeform prism has on light passing through the optical system 120 from a physical environment beyond the optical system 120 to the eye box 102. That is, the freeform compensation lens enables a user to have a clear view of the physical environment (i.e., within the user's FOV) without substantial distortion that may be introduced by the freeform prism, according to various embodiments.

Figure 4:
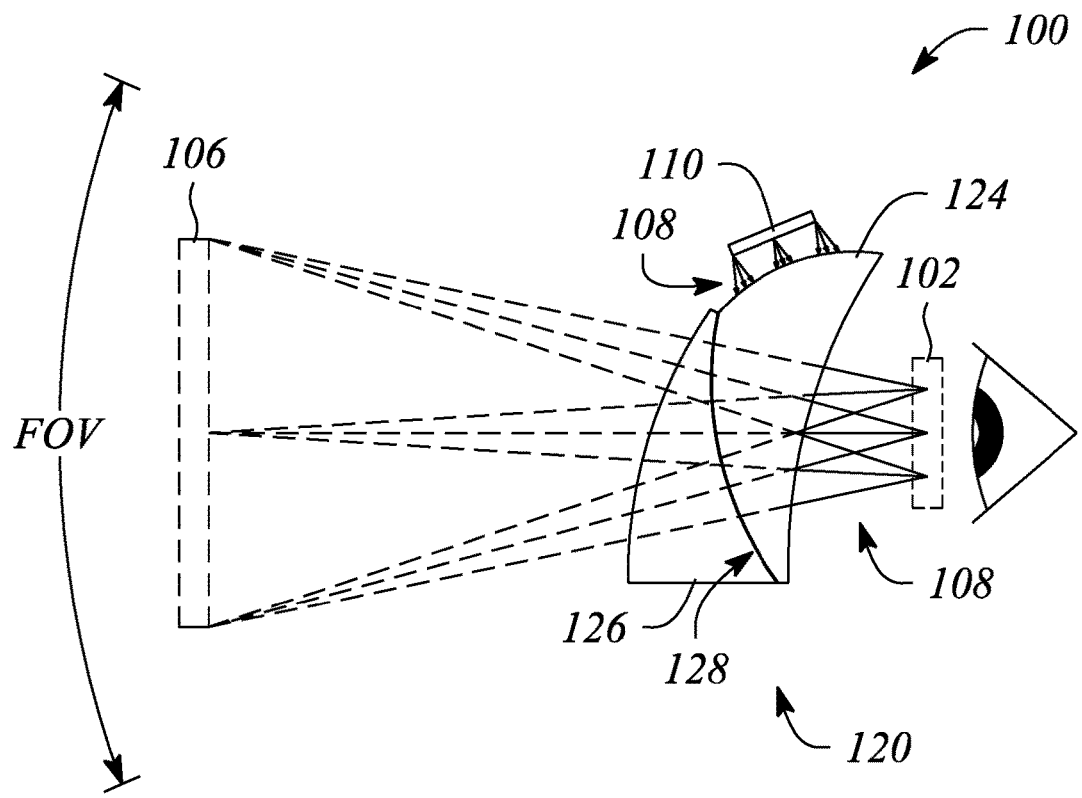
FIG. 4 illustrates a cross sectional view of a near-eye display having an optical system that includes a freeform prism in an example, according to an embodiment consistent with the principles described herein.

FIG. 4 illustrates a cross sectional view of a near-eye display 100 having an optical system 120 that includes a freeform prism 124 in an example, according to an embodiment consistent with the principles described herein. As illustrated in FIG. 4, the freeform prism 124 of the optical system 120 is positioned between the multibeam diffraction grating-based display 110 and the eye box 102 (i.e., an exit pupil) of the near-eye display 100. Light representing the displayed image including the plurality of different views 104 provided by the multibeam diffraction grating-based display 110 is relayed by the freeform prism 124 from an input aperture thereof to the eye box 102. Light from the multibeam diffraction grating-based display 110 is illustrated as rays 108 in FIG. 4. Relay of the rays 108 from an input of the freeform prism 124 to an output thereof may be provided by total internal reflection within the freeform prism 124, according to various embodiments.

FIG. 4 also illustrates an FOV of a user. The virtual image 106 is within the FOV to provide a superposition of the virtual image 106 and a view of the physical environment within the FOV. Further, the multibeam diffraction grating-based display 110 is outside of the FOV, as illustrated in FIG. 4. As such, FIG. 4 may illustrate an augmented reality display embodiment of the near-eye display 100, for example.

The optical system 120 illustrated in FIG. 4 further comprises a freeform compensation lens 126. According to various embodiments, the freeform compensation lens 126 may be provided in an optical path between the physical environment (e.g., to be viewed by a user) and the eye box 102. In particular, as illustrated, the freeform compensation lens 126 is located adjacent to the freeform prism 124 and between the physical environment and the freeform prism 124. The freeform compensation lens 126 is configured to correct for effects of the freeform prism 124 such that light rays (not illustrated) pass from objects in the physical environment to the eye box 102 according to a substantially straight path (i.e., the light rays are substantially undistorted). In some embodiments (as illustrated), a partial reflector or partially reflective surface 128 may be provided between the freeform compensation lens 126 and the freeform prism 124. The partially reflective surface 128 is configured to reflect light that is incident on the partially reflective surface 128 from within the freeform prism 124 and also configured to allow light from the physical environment to pass through the partially reflective surface 128.

Referring again to FIG. 2, in some embodiments, the multibeam diffraction grating-based display 110 comprises a plate light guide configured to guide a collimated light beam at a non-zero propagation angle. The multibeam diffraction grating-based display 110 further comprises an array of multibeam diffraction gratings at or adjacent to a surface of the plate light guide, in some embodiments. According to various embodiments, a multibeam diffraction grating of the array is configured to diffractively couple out a portion of the guided collimated light beam as a plurality of couple-out light beams having different principal angular directions that correspond to view directions of the plurality of different views 104 of the displayed image.

Figure 5A:
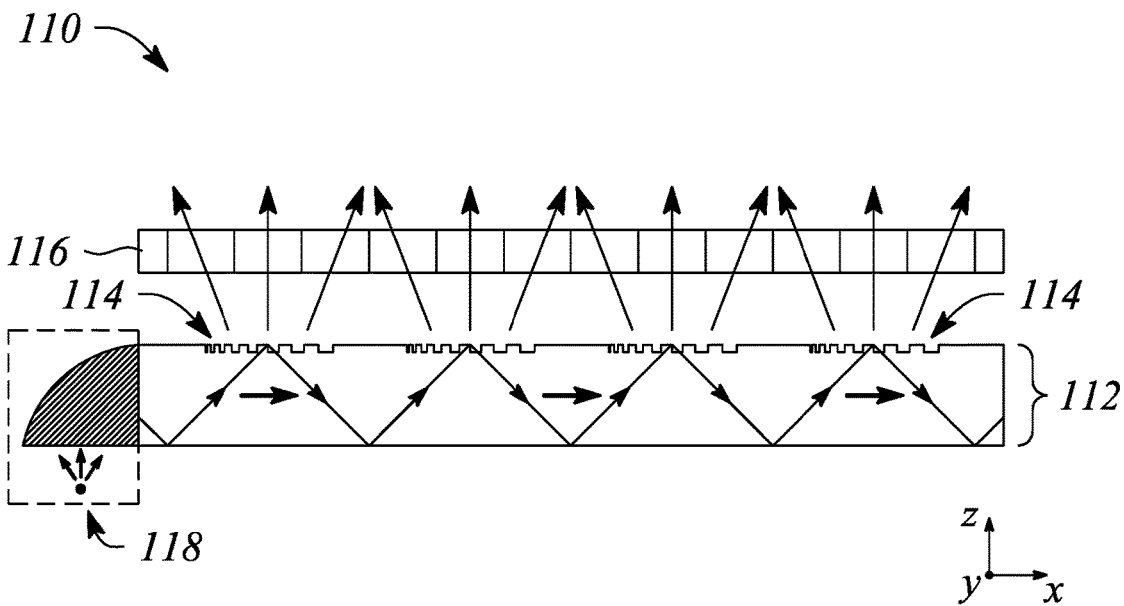
FIG. 5A illustrates a cross sectional view of a multibeam diffraction grating-based display in an example, according to an embodiment consistent with the principles described herein.
Figure 5B:
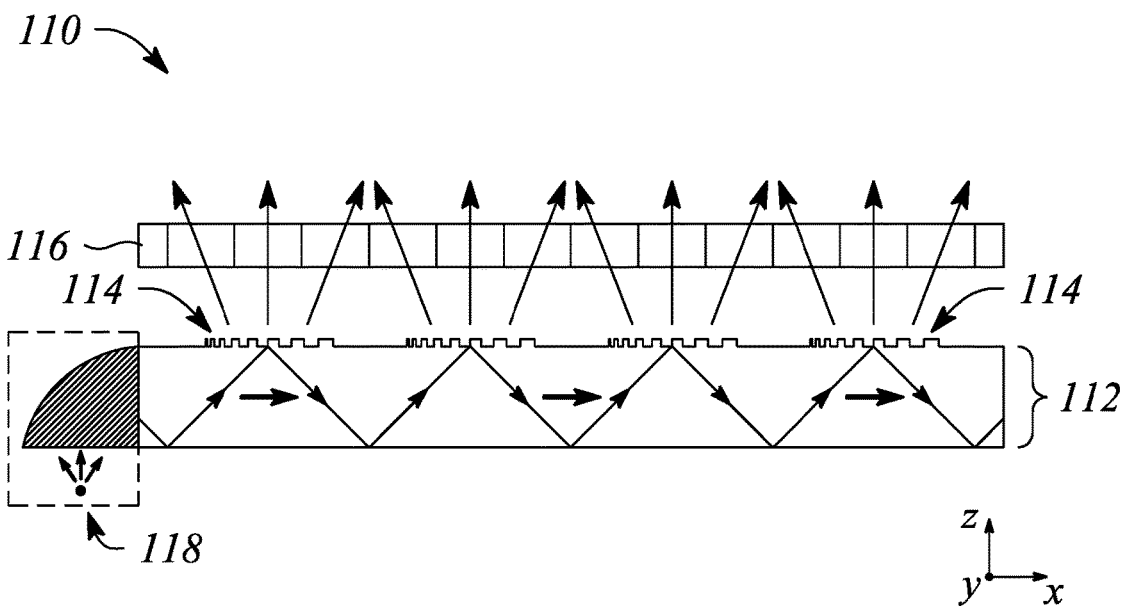
FIG. 5B illustrates a cross sectional view of a multibeam diffraction grating-based display in an example, according to another embodiment consistent with the principles described herein.

FIG. 5A illustrates a cross sectional view of a multibeam diffraction grating-based display 110 in an example, according to an embodiment consistent with the principles described herein. FIG. 5B illustrates a cross sectional view of a multibeam diffraction grating-based display 110 in an example, according to another embodiment consistent with the principles described herein. According to various embodiments, the multibeam diffraction grating-based display 110 illustrated in FIGS. 5A-5B is configured to produce a 'directional' light, i.e., light comprising light beams or light rays having different principal angular directions.

For example, as illustrated in FIGS. 5A-5B, the multibeam diffraction grating-based display 110 is configured to provide or generate a plurality of light beams illustrated as arrows directed out and away from the multibeam diffraction grating-based display 110 in different predetermined principal angular directions (e.g., as a light field). In turn, the light beams of the plurality may be modulated, as described below, to facilitate the display of information, i.e., different views of an image (e.g., the displayed image). In some embodiments, the light beams having different predetermined principal angular directions form a plurality of 3D views of a 3D image that is displayed by the multibeam diffraction grating-based display 110. Further, the multibeam diffraction grating-based display 110 may be a so-called 'glasses free' 3D electronic display (e.g., a multiview, 'holographic' or autostereoscopic display), according to some embodiments. In particular, with respect to the near-eye display 100, the different predetermined principal angular directions form the plurality of different views of the displayed image (e.g., the different views 104 illustrated in FIG. 2). As such, the modulated light beams may be the rays or light rays 108, described above.

As illustrated in FIGS. 5A and 5B, the multibeam diffraction grating-based display 110 comprises a plate light guide 112. The plate light guide 112 is configured to guide light as a guided light beam (illustrated as an extended arrow propagating in the plate light guide 112, as further described below). For example, the plate light guide 112 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light according to one or more guided modes of the plate light guide 112, for example.

According to various embodiments, light is guided by and along a length of the plate light guide 112. Further, the plate light guide 112 is configured to guide the light, as a guided light beam, at a non-zero propagation angle. The guided light beam may be guided at the non-zero propagation angle within the plate light guide 112 using total internal reflection, for example. In particular, the guided light beam propagates by reflecting or 'bouncing' between the top surface and the bottom surface of the plate light guide 112 at the non-zero propagation angle (e.g., illustrated by the extended, angled arrow representing a light ray of the guided light beam).

As defined herein, the 'non-zero propagation angle' is an angle relative to a surface (e.g., a top surface or a bottom surface) of the plate light guide 112. Further, the non-zero propagation angle is both greater than zero and less than a critical angle of total internal reflection within the plate light guide, according to various embodiments. For example, the non-zero propagation angle of the guided light beam may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees.

The light guided as the guided light beam in the plate light guide 112 may be introduced or coupled into the plate light guide 112 at the non-zero propagation angle (e.g., about 30-35 degrees). One or more of a lens, a mirror or similar reflector (e.g., a tilted collimating reflector), and a prism (not illustrated) may facilitate coupling light into an input end of the plate light guide 112 as the beam of light at the non-zero propagation angle, for example. Once coupled into the plate light guide 112, the guided light beam propagates along the plate light guide 112 in a direction that is generally away from the input end (e.g., illustrated by bold arrows pointing along an x-axis in FIGS. 5A-5B).

Further, the guided light beam produced by coupling light into the plate light guide 112 may be a collimated light beam, according to various embodiments. In particular, by 'collimated light beam' it is meant that rays of light within the guided light beam are substantially parallel to one another within the guided light beam. Rays of light that diverge or are scattered from the collimated light beam of the guided light beam are not considered to be part of the collimated light beam, by definition herein. Collimation of the light to produce the collimated guided light beam may be provided by a collimator including, but not limited to, the lens or mirror (e.g., tilted collimating reflector, etc.) described above that is used to couple the light into the plate light guide 112.

In some embodiments, the plate light guide 112 may be a slab or plate optical waveguide comprising an extended, substantially planar sheet of optically transparent, dielectric material. The substantially planar sheet of dielectric material is configured to guide the guided light beam using total internal reflection. According to various embodiments, the optically transparent material of the plate light guide 112 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some embodiments, the plate light guide 112 may further include a cladding layer on at least a portion of a surface (e.g., one or both of the top surface and the bottom surface) of the plate light guide 112 (not illustrated). The cladding layer may be used to further facilitate total internal reflection, according to some examples.

In FIGS. 5A and 5B, the multibeam diffraction grating-based display 110 further comprises an array of multibeam diffraction gratings 114. As illustrated in FIGS. 5A-5B, the multibeam diffraction gratings 114 are located at a surface of the plate light guide 112 (e.g., a top or front surface). In other examples (not illustrated), one or more of the multibeam diffraction gratings 114 may be located within the plate light guide 112. In yet other examples (not illustrated), one or more of the multibeam diffraction gratings 114 may be located at or on a bottom or back surface of the plate light guide 112 (i.e., an opposite surface to the surface illustrated with the multibeam diffraction gratings 114). In combination, the plate light guide 112 and the array of multibeam diffraction gratings 114 provide or serve as a multibeam grating-based backlight of the multibeam diffraction grating-based display 110.

According to various embodiments, a multibeam diffraction grating 114 of the array is configured to scatter or diffractively couple out a portion of the guided light beam as the plurality of light beams having different principal angular directions corresponding to different views of the multibeam diffraction grating-based display 110. For example, the portion of the guided light beam may be diffractively coupled out by the multibeam diffraction grating 114 through the plate light guide surface (e.g., through the top surface of the plate light guide 112). Further, the multibeam diffraction grating 114 is configured to diffractively couple out the portion of the guided light beam as coupled-out light beams and to diffractively redirect the coupled-out light beams away from the plate light guide surface. As discussed above, each of the coupled-out light beams of the plurality may have a different predetermined principal angular direction determined by characteristics of diffractive features of the multibeam diffraction grating 114

In particular, the multibeam diffraction gratings 114 of the array include a plurality of diffractive features that provide diffraction. The provided diffraction is responsible for the diffractive coupling of the portion of the guided light beam out of the plate light guide 112. For example, the multibeam diffraction grating 114 may include one or both of grooves in a surface of the plate light guide 112 and ridges protruding from the plate light guide surface that serve as the diffractive features. The grooves and the ridges may be arranged parallel to one another and, at least at some point along the diffractive features, the grooves and the ridges are perpendicular to a propagation direction of the guided light beam that is to be coupled out by the multibeam diffraction grating 114.

In some examples, the grooves or the ridges may be etched, milled or molded into the plate light guide surface. As such, a material of the multibeam diffraction gratings 114 may include the material of the plate light guide 112. As illustrated in FIG. 5A, for example, the multibeam diffraction gratings 114 include substantially parallel grooves that penetrate the surface of the plate light guide 112. In FIG. 5B, the multibeam diffraction gratings 114 include substantially parallel ridges that protrude from the surface of the plate light guide 112. In other examples (not illustrated), the multibeam diffraction gratings 114 may comprise a film or layer applied or affixed to the plate light guide surface.

According to some embodiments, the multibeam diffraction grating 114 may be or comprise a chirped diffraction grating. By definition, the 'chirped' diffraction grating is a diffraction grating exhibiting or having a diffraction spacing of the diffractive features (i.e., a diffraction pitch) that varies across an extent or length of the chirped diffraction grating, e.g., as illustrated in FIGS. 5A-5B. Herein, the varying diffraction spacing is defined and referred to as a 'chirp'. As a result of the chirp, the portion of the guided light beam that is diffractively coupled out of the plate light guide 112 exits or is emitted from the chirped diffraction grating as the coupled-out light beams at different diffraction angles corresponding to different points of origin across the chirped diffraction grating of the multibeam diffraction grating 114. By virtue of a predefined chirp, the chirped diffraction grating is responsible for the predetermined and different principal angular directions of the coupled-out light beams of the light beam plurality.

In some examples, the chirped diffraction grating of the multibeam diffraction grating 114 may have or exhibit a chirp of the diffractive spacing that varies linearly with distance. As such, the chirped diffraction grating is a 'linearly chirped' diffraction grating, by definition. FIGS. 5A-5B illustrate the multibeam diffraction grating 114 as a linearly chirped diffraction grating, by way of example and not limitation. In particular, as illustrated, the diffractive features are closer together at a first end of the multibeam diffraction grating 114 than at a second end. Further, the diffractive spacing of the illustrated diffractive features varies linearly from the first end to the second end (i.e., in a direction of the bold arrows), as illustrated.

In another example (not illustrated), the chirped diffraction grating of the multibeam diffraction grating 114 may exhibit a non-linear chirp of the diffractive spacing. Various non-linear chirps that may be used to realize the multibeam diffraction grating 114 include, but are not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

Figure 5C:
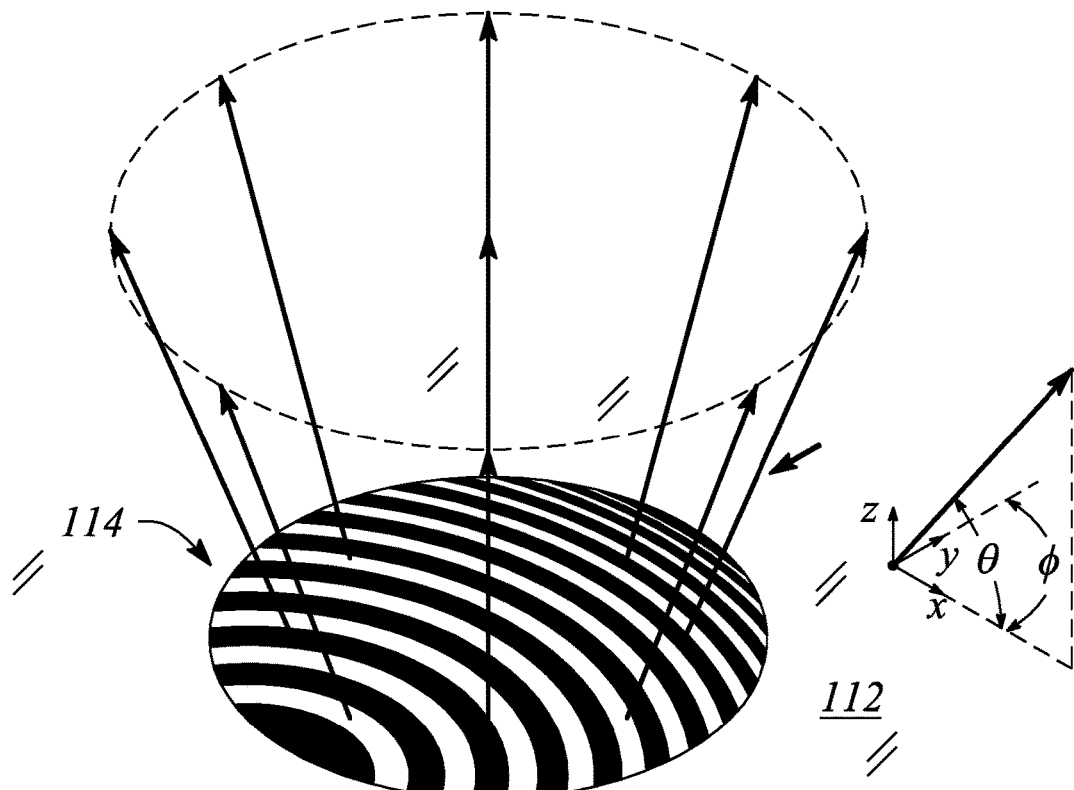
FIG. 5C illustrates a perspective view of a multibeam diffraction grating in an example, according to an embodiment consistent with the principle described herein.

According to some embodiments, the multibeam diffraction grating 114 may comprise diffractive features that are one or both of curved and chirped. FIG. 5C illustrates a perspective view of a multibeam diffraction grating 114 in an example, according to an embodiment consistent with the principle described herein. As illustrated in FIG. 5C, the multibeam diffraction grating 114 is in, at or on a surface of the plate light guide 112. Further, the illustrated multibeam diffraction grating 114 comprises diffractive features that are both curved and chirped (i.e., the multibeam diffraction grating 114 in FIG. 5C is a curved, chirped diffraction grating).

As illustrated in FIG. 5C, the guided light beam has an incident direction relative to the multibeam diffraction grating 114 illustrated as a bold arrow at a first end of the multibeam diffraction grating 114. Also illustrated is the plurality of coupled-out or emitted light beams illustrated by arrows pointing away from the multibeam diffraction grating 114 at the surface of the plate light guide 112. The light beams are emitted in a plurality of predetermined different principal angular directions. In particular, the predetermined different principal angular directions of the emitted light beams are different from one another in both azimuth and elevation, as illustrated. According to various examples, both the predefined chirp of the diffractive features and the curve of the diffractive features may be responsible for the predetermined different principal angular directions of the emitted light beams.

In particular, at different points along the curve of the diffractive features, an 'underlying diffraction grating' of the multibeam diffraction grating 114 associated with the curved diffractive features has different azimuthal orientation angles. By 'underlying diffraction grating', it is meant a diffraction grating of a plurality of non-curved diffraction gratings that, in superposition, yields the curved diffractive features of the multibeam diffraction grating 114. At a given point along the curved diffractive features, the curve has a particular azimuthal orientation angle that generally differs from the azimuthal orientation angle at another point along the curved diffractive features. Further, the particular azimuthal orientation angle results in a corresponding azimuthal component of a principal angular direction of a light beam emitted from the given point. In some examples, the curve of the diffractive features (e.g., grooves, ridges, etc.) may represent a section of a circle. The circle may be coplanar with the light guide surface. In other examples, the curve may represent a section of an ellipse or another curved shape, e.g., that is coplanar with the light guide surface.

According to some embodiments, the multibeam diffraction grating-based display 110 further comprises an array of light valves or a light valve array 116. The light valve array 116 may be configured to selectively modulate the coupled-out light beams as a plurality of pixels (i.e., modulated pixels) corresponding to pixels of the different views of the displayed image. For example, referring to FIGS. 5A-5B, the light valve array 116 is illustrated adjacent to the plate light guide surface. According to various embodiments, the light valve array 116 is configured to modulate the differently directed light beams (i.e., the plurality of light beams having different predetermined principal angular directions from the multibeam diffraction gratings 114) corresponding to the different views of the displayed image. In particular, the light beams of the light beam plurality pass through and are modulated by individual light valves of the light valve array 116. The modulated, differently directed light beams (i.e., rays 108) may represent pixels of the different views of the displayed image depending on the different directions of the coupled-out light beams, according to various embodiments. In various embodiments, different types of light valves may be employed in the light valve array 116 including, but not limited to, one or more of liquid crystal light valves, electrophoretic light valves, and light valves based on electrowetting.

According to some embodiments (e.g., as illustrated in FIGS. 5A-5B), the multibeam diffraction grating-based display 110 may further comprise a light source 118. The light source 118 is configured to provide the collimated light beam to the plate light guide 112. In particular, the light source 118 may be located adjacent to an entrance surface or end (input end) of the plate light guide 112. In various embodiments, the light source 118 may comprise substantially any source of light (e.g., optical emitter) including, but not limited to, one or more light emitting diodes (LEDs) or laser (e.g., laser diode). In some embodiments, the light source 118 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In some embodiments, the light source 118 may comprise a plurality of different optical emitters configured to provide different colors of light. The different optical emitters may be configured to provide light having different, color-specific, non-zero propagation angles of collimated light beams corresponding to each of the different colors of light.

In some embodiments, the light source 118 may further comprise a collimator (illustrated as a shaded region in FIGS. 5A-5B). The collimator may be configured to receive substantially uncollimated light from one or more of the optical emitters of the light source 118. The collimator is further configured to convert the substantially uncollimated light into a collimated light beam. In particular, the collimator may provide a collimated light beam that is collimated in two substantially orthogonal directions, according to some embodiments. Moreover, when optical emitters of different colors are employed, the collimator may be configured to provide the collimated light beams having the different, color-specific, non-zero propagation angles. The collimator is further configured to communicate the collimated light beam to the plate light guide 112 to propagate as the collimated, guided light beam having the non-zero propagation angle, described above.

Figure 6:
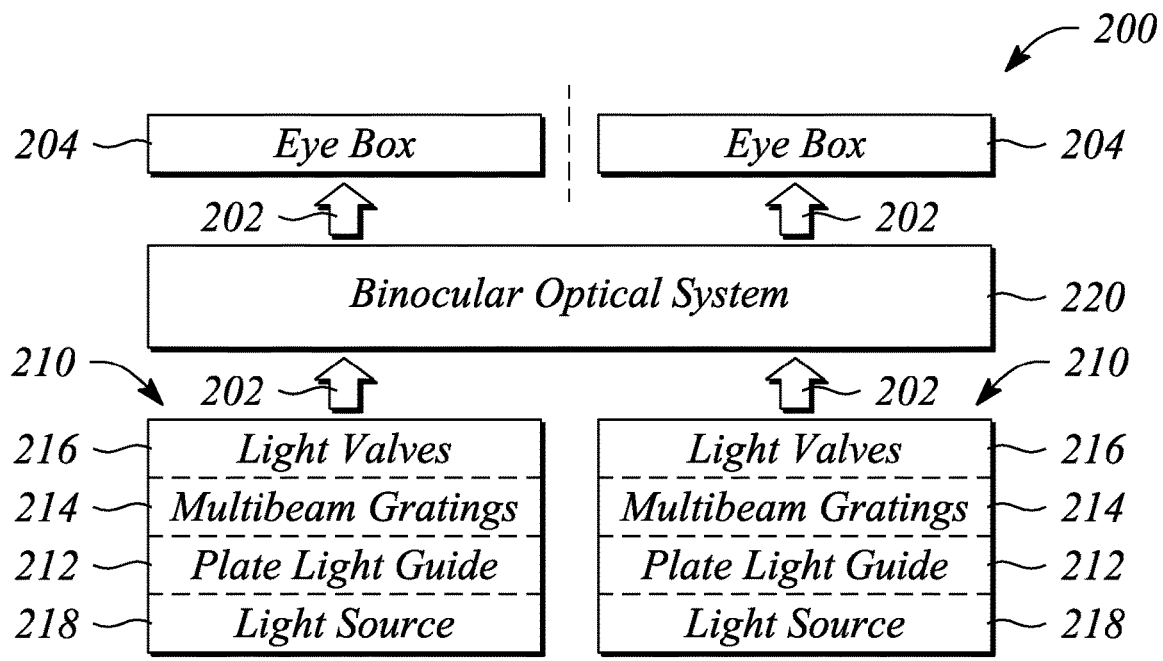
FIG. 6 illustrates a block diagram of a near-eye binocular display system in an example, according to an embodiment consistent with the principles described herein.

In accordance with some embodiments of the principles described herein, a near-eye binocular display system is provided. FIG. 6 illustrates a block diagram of a near-eye binocular display system 200 in an example, according to an embodiment consistent with the principles described herein. The near-eye binocular display system 200 is configured to provide a pair of stereoscopic images 202 of a three-dimensional (3D) scene and to relay the pair of stereoscopic images 202 to a corresponding pair of eye boxes 204 for viewing by a user. According to various embodiments, the eye boxes 204 of the pair are laterally displaced from one another to correspond with locations of the user's eyes. In particular, the user may comfortably and naturally view the pair of stereoscopic images 202 at the pair of laterally displaced eye boxes 204. Further, the pair of stereoscopic images 202 may both provide a 3D experience as well as address various convergence-accommodation issues often associated with near-eye stereoscopic displays, according to some embodiments.

As illustrated in FIG. 6, the near-eye binocular display system 200 comprises a pair of multibeam diffraction grating-based displays 210. According to various embodiments, each multibeam diffraction grating-based display 210 is configured to provide a different image 202 from the image 202 provided by the other multibeam diffraction grating-based display 210 of the pair. The different images 202 of the pair are stereoscopic images 202 of a 3D scene. In some embodiments, one or both of multibeam diffraction grating-based display 210 of the pair may be substantially similar to the multibeam diffraction grating-based display 110, described above with respect to the near-eye display 100.

In particular, as illustrated, the multibeam diffraction grating-based displays 210 each comprises a plate light guide 212 and an array of multibeam diffraction gratings 214 or simply 'multibeam gratings 214' (e.g., as illustrated). In some embodiments, the plate light guide 212 may be substantially similar to the plate light guide 112 and the array of multibeam diffraction gratings 214 may be substantially similar to the array of multibeam diffraction gratings 114 of the multibeam diffraction grating-based display 110. In particular, the multibeam diffraction gratings 214 may be located at or adjacent to a surface of the plate light guide 212. Further, in some embodiments, a multibeam diffraction grating 214 of the array may be configured to diffractively couple out guided light from within the plate light guide 212 as a plurality of coupled-out light beams. In some embodiments, the multibeam diffraction grating 214 comprises a chirped diffraction grating having curved diffractive features. In some embodiments, a chirp of the chirped diffraction grating is a linear chirp.

According to some embodiments, each of the provided images 202 of the stereoscopic image pair provided by the pair of multibeam diffraction grating-based displays 210 comprises a plurality of different views of the 3D scene. The different views may represent different perspectives of the 3D scene, for example. Further, in various embodiments, the coupled-out light beams of the plurality may have different principal angular directions corresponding to 3D view directions of the different views of the plurality different views (i.e., 3D perspective views) of the 3D scene.

The near-eye binocular display system 200 illustrated in FIG. 6 further comprises a binocular optical system 220. The binocular optical system 220 is configured to separately relay the different images 202 of the stereoscopic image pair provided by the pair of multibeam diffraction grating-based displays 210 to a corresponding pair of eye boxes 204. The eye boxes 204 are laterally displaced from one another, according to various embodiments. As noted above, the lateral displacement of the eye boxes 204 may facilitate viewing by the user, for example. A vertical dashed line between the eye boxes 204 illustrated in FIG. 6 depicts lateral displacement.

In some embodiments, the binocular optical system 220 may be substantially similar to the optical system 120 of the near-eye display 100, albeit arranged in a binocular con-figuration. In particular, the binocular optical system 220 may be configured to relay the plurality of different views (e.g., 3D views) to a corresponding plurality of different locations within the eye boxes 204. In addition, the different locations within the eye box 204 are configured to provide depth focus cues to a user of the near-eye binocular display system 200. In particular, the depth focus cues may correspond to binocular disparity between the provided images 202 of the stereoscopic image pair, according to various embodiments.

Further, according to some embodiments, the binocular optical system 220 may comprise a first freeform prism and a second freeform prism (not illustrated in FIG. 6). The first freeform prism may be configured to relay the image 202 provided by a first multibeam diffraction grating-based display 210 of the multibeam diffraction grating-based display pair to a first eye box 204 of the eye box pair. Similarly, the second freeform prism may be configured to relay the image 202 provided by a second multibeam diffraction grating-based display 210 of the multibeam diffraction grating-based display pair to a second eye box 204 of the eye box pair. In other embodiments (not illustrated), the binocular optical system 220 may comprise a pair of magnifiers (e.g., a pair of simple magnifiers substantially similar to the simple magnifier 122, described above).

In some embodiments, the near-eye binocular display system 200 is configured to be a virtual reality display system. In particular, the provided different images 202 of the stereoscopic pair may be configured to supplant a binocular view of a physical environment, at least within the eye boxes 204. In other embodiments, the near-eye binocular display system 200 illustrated in FIG. 6 may be configured to be an augmented reality display system. When configured as an augmented reality display system, the provided different images 202 of the stereoscopic pair may augment, but generally do not supplant, the physical environment view within the eye boxes 204, for example. That is, the near-eye binocular display system 200 configured as an augmented reality display system provides to a user an optical superposition of the stereoscopic image pair and a view of the physical environment. Further, when configured as an augmented reality display system, the binocular optical system 220 may further comprise a pair of freeform compensation lenses. The freeform compensation lenses may be configured to provide an image of a physical environment to the pair of eye boxes 204, according to various embodiments.

According to some embodiments, the multibeam diffraction grating-based display 210 may further comprise an array of light valves 216 and a light source 218. In some embodiments, the array of light valves 216 may be substantially similar to the light valve array 116 described above with respect to the multibeam diffraction grating-based display 110 of the near-eye display 100. For example, the array of light valves 216 may be located adjacent to a surface of the plate light guide 212. According to various embodiments, the light valves 216 are configured to selectively modulate the coupled-out light beams from the multibeam diffraction gratings 214 as a plurality of pixels or modulated light beams corresponding to pixels of the provided image 202 of the stereoscopic image pair. In some embodiments, a light valve 216 of the array comprises a liquid crystal light valve. In other embodiments, the light valves 216 of the light valve array may comprise another light valve including, but not limited to, an electrowetting light valve, an electrophoretic light valve, a combination thereof, or a combination of liquid crystal light valves and another light valve type, for example.

According to some embodiments, the multibeam diffraction grating-based display 210 may further comprise a light source 218. The light source 218 is configured to provide light to the plate light guide 212. In some embodiments, the light source 218 may include an optical collimator configured to collimate the light provided by the light source 218. The plate light guide 212 of the multibeam diffraction grating-based display 210 may be configured to guide the collimated light at a non-zero propagation angle as a collimated light beam, according to various embodiments. According to some embodiments, the light source 218 may be substantially similar to the light source 118 of the multibeam diffraction grating-based display 110 described above with respect to the near-eye display 100.

In some embodiments, the light source 218 may comprise a plurality of different light emitting diodes (LEDs) configured to provide different colors of light (referred to as 'different colored LEDs' for simplicity of discussion). In some embodiments, the different colored LEDs may be offset (e.g., laterally offset) from one another or otherwise configured in conjunction with the collimator to provide different, color-specific, non-zero propagation angles of collimated light beams within the plate light guide 212. Further, a different, color-specific, non-zero propagation angle may correspond to each of the different colors of light provided by the light source 218.

In some embodiments (not illustrated), the different colors of light may comprise the colors red, green and blue of a red-green-blue (RGB) color model. Further, the plate light guide 212 may be configured to guide the different colors as collimated light beams at different color-dependent non-zero propagation angles within the plate light guide 212. For example, a first guided color light beam (e.g., a red light beam) may be guided at a first color-dependent, non-zero propagation angle, a second guided color light beam (e.g., a green light beam) may be guided at a second color-dependent non-zero propagation angle, and a third guided color light beam (e.g., a blue light beam) may be guided at a third color-dependent non-zero propagation angle, according to some embodiments.

Figure 7:
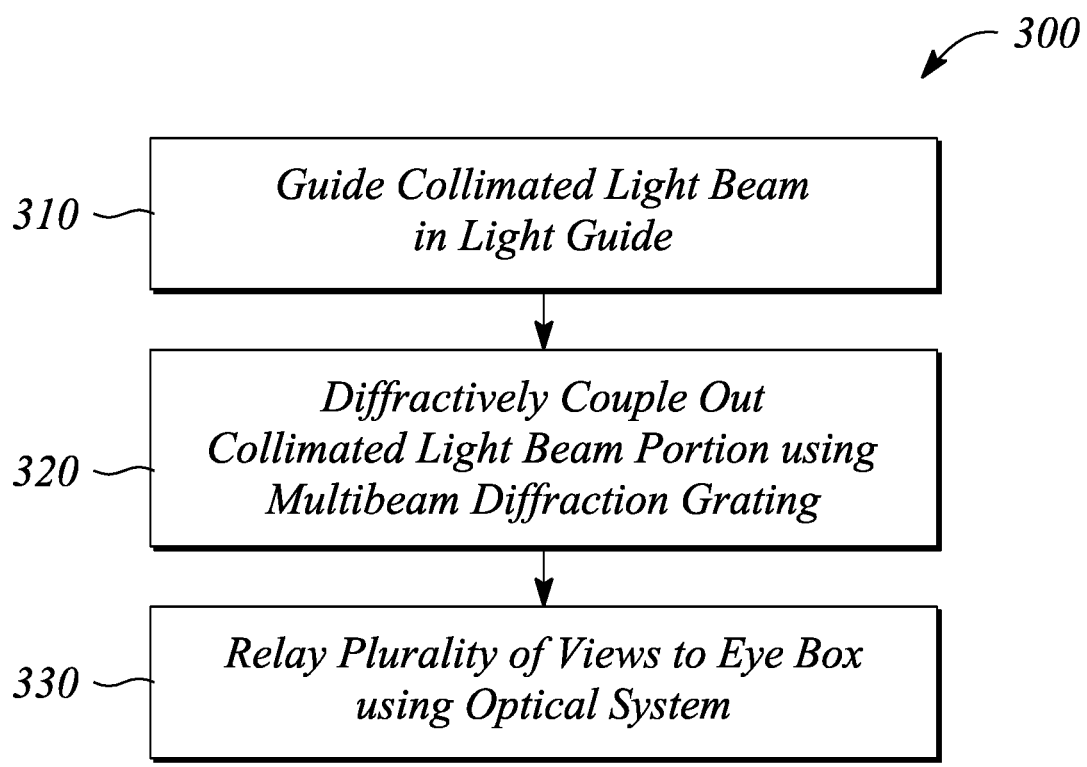
FIG. 7 illustrates a flow chart of a method of near-eye display operation in an example, according to an embodiment consistent with the principles described herein.

In accordance with other embodiments of the principles described herein, a method of near-eye display operation is provided. FIG. 7 illustrates a flow chart of a method 300 of near-eye display operation in an example, according to an embodiment consistent with the principles described herein. As illustrated in FIG. 7, the method 300 of near-eye display operation comprises guiding 310 a collimated light beam in a light guide at a non-zero propagation angle. According to various embodiments, the collimated light beam may be guided in a plate light guide that is substantially similar to the plate light guide 112 described above with respect to the near-eye display 100. Moreover, the collimated light beam may be guided 310 at the non-zero propagation angle as described above with respect to the near-eye display 100.

The method 300 of near-eye display operation further comprises diffractively coupling out 320 a portion of the guided collimated light beam from the light guide using a multibeam diffraction grating to produce a plurality of coupled-out light beams directed away from the light guide at different principal angular directions to form a light field. According to various embodiments, the light field provides a plurality of different views of an image (e.g., a displayed image) corresponding to the different principal angular directions of the coupled-out light beams. In some embodiments, the multibeam diffraction grating is substantially similar to the multibeam diffraction grating 114 described above with respect to the near-eye display 100. In particular, the light guide used in guiding 310 collimated light beam and the multibeam diffraction grating used in diffractively coupling out 320 a collimated light beam portion may be part of a multibeam diffraction grating-based display that is substantially similar to the multibeam diffraction grating-based display 110 of the near-eye display 100.

As illustrated in FIG. 7, the method 300 of near-eye display operation further comprises relaying 330 the plurality of different views of an image to an eye box using an optical system. In some embodiments, the optical system may be substantially similar to the optical system 120 of the near-eye display 100, described above. In particular, according to some embodiments, relaying 330 the plurality of different views of an image relays different ones of the different views to different locations within the eye box to afford depth focus cues to a user viewing the image in the eye box. The depth focus cues may facilitate image accommodation by a user's eye, for example.

In some embodiments, the relayed image may comprise a three-dimensional (3D) image and the different views of the plurality of different views may represent different perspective views of the 3D image. In some embodiments, the relayed image is an image of a stereoscopic pair of images. Further, the plurality of different views of the image may include at least four different views, in some examples. In some embodiments, relaying 330 the plurality of different views of an image comprises magnifying the image to provide a virtual image located at a distance from the eye box corresponding to a normal accommodation range of an eye of a user. In some embodiments, relaying 330 the plurality of different views provides one or both of an augmented reality display and a virtual reality display of the image.

Thus, there have been described examples and embodiments of a near-eye display, a binocular near-eye display system and a method of near-eye display operation that employ a multibeam diffraction grating-based display to provide a plurality of different views of an image. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A near-eye display comprising:
   a multibeam diffraction grating-based display configured to provide a plurality of different views of an image; and
   an optical system configured to relay the plurality of different views of the image to a corresponding plurality of different locations within an eye box at an output of the near-eye display, the corresponding plurality of different locations within the eye box being configured to impart focus depth cues to a user of the near-eye display.

2. The near-eye display of claim 1, wherein the image comprises a three-dimensional (3D) image, and wherein different views of the plurality of different views represent different perspective views of the 3D image.

3. The near-eye display of claim 1, wherein the plurality of different views of the image includes at least four different views.

4. The near-eye display of claim 1, wherein the plurality of different views has a total angular extent and the optical system has an input aperture, the total angular extent being configured to substantially correspond to a size of the input aperture.

5. The near-eye display of claim 1, wherein the optical system comprises a simple magnifier configured to provide a virtual image of the image at a distance from the eye box corresponding to a normal accommodation range of an eye of a user.

6. The near-eye display of claim 1, wherein both of the multibeam diffraction grating-based display and the optical system are located within a field-of-view (FOV) of a user to substantially block a portion of the FOV, the near-eye display being a virtual reality display configured to supplant a view of a physical environment with the image within the blocked FOV portion.

7. The near-eye display of claim 1, wherein the multibeam diffraction grating-based display is located outside of a field-of-view (FOV) of a user, the optical system being located within the FOV, the near-eye display being an augmented reality display configured to augment a view of a physical environment in the FOV with the image.

8. The near-eye display of claim 1, wherein the optical system comprises a freeform prism.

9. The near-eye display of claim 8, wherein the optical system further comprises a freeform compensation lens.

10. The near-eye display of claim 1, wherein the multibeam diffraction grating-based display comprises:
a plate light guide configured to guide a collimated light beam at a non-zero propagation angle; and
an array of multibeam diffraction gratings at a surface of the plate light guide, a multibeam diffraction grating of the array being configured to diffractively couple out a portion of the guided collimated light beam as a plurality of coupled-out light beams having different principal angular directions that correspond to view directions of the plurality of different views of the image.

11. The near-eye display of claim 10, wherein the multibeam diffraction grating is a linearly chirped diffraction grating.

12. The near-eye display of claim 10, wherein the multibeam diffraction grating-based display further comprises:
a light source configured provide the collimated light beam to plate light guide; and
a light valve array adjacent to the plate light guide surface, the light valve array being configured to selectively modulate the coupled-out light beams as a plurality of pixels corresponding to of the plurality of different views of the image.

13. The near-eye display of claim 12, wherein the light source comprises a plurality of different optical sources configured to provide different colors of light, the different optical sources being configured to provide different, color-specific, non-zero propagation angles of collimated guided light beams corresponding to each of the different colors of light.

14. A near-eye binocular display system comprising a pair of the near-eye display of claim 1, wherein a first near-eye display of the pair is configured to provide a first plurality of different views of a first image to a first eye box, a second near-eye display of the pair being configured to provide a second plurality of different views of a second image to a second eye box, the second eye box being laterally offset from the first eye box, the first image and the second image representing a stereoscopic pair of images.

15. A near-eye binocular display system comprising:
a pair of multibeam diffraction grating-based displays, each multibeam diffraction grating-based display being configured to provide a different image of a pair of stereoscopic images representing a three-dimensional (3D) scene; and
a binocular optical system configured to separately relay the different images of the stereoscopic image pair to a corresponding pair of eye boxes, the eye boxes being laterally displaced from one another,
wherein a multibeam diffraction grating-based display of the display pair comprises a plate light guide and an array of multibeam diffraction gratings, a multibeam diffraction grating of the array being configured to diffractively couple out guided light from within the plate light guide as a plurality of coupled-out light beams, the coupled-out light beam plurality being configured to provide the different image of the stereoscopic image pair.

16. The near-eye binocular display system of claim 15, wherein each of the different images of the stereoscopic image pair comprises a plurality of different views of the 3D scene, the coupled-out light beams of the plurality having different principal angular directions corresponding to 3D view directions of the different views of the coupled-out light beam plurality.

17. The near-eye binocular display system of claim 16, wherein the binocular optical system is configured to relay the plurality of different views to a corresponding plurality of different locations within the eye boxes, the different locations of the different views within the eye boxes being configured to provide depth focus cues to a user of the near-eye binocular display system, the depth focus cues corresponding to binocular disparity between the different images of the stereoscopic image pair.

18. The near-eye binocular display system of claim 15, wherein the binocular optical system comprises a first freeform prism and a second freeform prism, the first freeform prism being configured to relay an image provided by a first multibeam diffraction grating-based display of the multibeam diffraction grating-based display pair to a first eye box of the eye box pair, the second freeform prism being configured to relay a different image provided by a second multibeam diffraction grating-based display of the multibeam diffraction grating-based display pair to a second eye box of the eye box pair.

19. The near-eye binocular display system of claim 18, wherein the binocular optical system further comprises a pair of freeform compensation lenses configured to provide different images of a physical environment to the pair of eye boxes, the near-eye binocular display system being an augmented reality display system.

20. The near-eye binocular display system of claim 15, wherein the provided different images of the stereoscopic image pair are configured supplant a binocular view of a physical environment within the eye boxes, the near-eye binocular display system being configured as a virtual reality display system.

21. The near-eye binocular display system of claim 15, wherein the multibeam diffraction grating-based display further comprises:
a light source configured to provide light;
an optical collimator configured to collimate the light provided by the light source; and
an array of light valves adjacent to the plate light guide, the light valve array being configured to selectively modulate the coupled-out light beams as a plurality of pixels corresponding to pixels of the provided image of the stereoscopic image pair, wherein the plate light guide is configured to guide the collimated light at a non-zero propagation angle as a collimated light beam.

22. A method of near-eye image display operation, the method comprising:

guiding a collimated light beam in a light guide at a non-zero propagation angle;

diffractively coupling out a portion of the guided collimated light beam from the light guide using a multi-beam diffraction grating to produce a plurality of coupled-out light beams directed away from the light guide at different principal angular directions to form a light field, the light field providing a plurality of different views of an image corresponding to the different principal angular directions of the coupled-out light beams; and relaying the plurality of different views of the image to an eye box using an optical system.

23. The method of near-eye image display operation of claim 22, wherein relaying the plurality of different views relays different ones of the different views to different locations within the eye box, the different locations of different views affording depth focus cues to a user viewing the image in the eye box.

24. The method of near-eye image display operation of claim 22, wherein relaying the plurality of different views of the image comprises magnifying the image to provide a virtual image located at a distance from the eye box corresponding to a normal accommodation range of an eye of a user.

25. The method of near-eye image display operation of claim 22, wherein relaying the plurality of different views of the image provides one or both of an augmented reality display and a virtual reality display of the image.

* * * * *